US009747922B2

(12) United States Patent
Hwang et al.

(10) Patent No.: US 9,747,922 B2
(45) Date of Patent: Aug. 29, 2017

(54) SOUND SIGNAL PROCESSING METHOD, AND SOUND SIGNAL PROCESSING APPARATUS AND VEHICLE EQUIPPED WITH THE APPARATUS

(71) Applicants: HYUNDAI MOTOR COMPANY, Seoul (KR); KIA MOTORS CORPORATION, Seoul (KR); SOGANG UNIVERSITY RESEARCH FOUNDATION, Seoul (KR)

(72) Inventors: Yunil Hwang, Yongin-si (KR); Biho Kim, Seoul (KR); Hyung Min Park, Seoul (KR)

(73) Assignees: HYUNDAI MOTOR COMPANY, Seoul (KR); KIA MOTORS CORPORATION, Seoul (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 198 days.

(21) Appl. No.: 14/580,209

(22) Filed: Dec. 22, 2014

(65) Prior Publication Data

US 2016/0086602 A1 Mar. 24, 2016

(30) Foreign Application Priority Data

Sep. 19, 2014 (KR) ...................... 10-2014-00125005

(51) Int. Cl.
*G10L 15/00* (2013.01)
*G10L 21/028* (2013.01)
(Continued)

(52) U.S. Cl.
CPC ........ *G10L 21/028* (2013.01); *G10L 21/0208* (2013.01); *G10L 21/0232* (2013.01); *G10L 2021/02166* (2013.01)

(58) Field of Classification Search
CPC H04R 3/005; H04R 2225/41; H04R 2225/43; H04R 25/405; H04R 25/407
(Continued)

(56) References Cited

U.S. PATENT DOCUMENTS 7,970,564 B2 6/2011 Wang et al.
9,390,713 B2 * 7/2016 Tzirkel-Hancock .... G10L 15/20

FOREIGN PATENT DOCUMENTS

JP 2010-020294 A 1/2010
JP 2011-191759 A 9/2011
(Continued)

OTHER PUBLICATIONS

Korean Office Action dated Aug. 18, 2015 issued in Korean Patent Application No. 10-2014-0125005 (English translation).
(Continued)

*Primary Examiner* — Charlotte M Baker
(74) *Attorney, Agent, or Firm* — McDermott Will & Emery LLP

(57) ABSTRACT

A sound signal processing method, the sound signal processing apparatus and the vehicle equipped with the apparatus, in which the sound signal processing apparatus includes a spatial filtering unit configured to obtain a filtered signal including a target signal by a spatial filtering by applying a spatial filter to an input signal, and a mask application unit configured to obtain an output signal by applying a mask to the filtered signal. The mask may be obtained by using a spatial selectivity between the target signal and noise of the target signal.

27 Claims, 6 Drawing Sheets

(51) Int. Cl.
*G10L 21/0208* (2013.01)
*G10L 21/0232* (2013.01)
*G10L 21/0216* (2013.01)

(58) Field of Classification Search
USPC ....... 704/233, 200, 206, 226, 227, 228, 210; 381/86, 92, 18, 1, 17
See application file for complete search history.

(56) References Cited

FOREIGN PATENT DOCUMENTS

| | | | |
|---|---|---|---|
| KR | 10-2009-0037692 | A | 4/2009 |
| KR | 10-2009-0050372 | A | 5/2009 |
| WO | 2009/051959 | A1 | 4/2009 |

OTHER PUBLICATIONS

B. Kim, et al., "Speech enhancement based on soft-masking exploiting both output SNR and selectivity of spatial filtering," Electronic Letters, Jun. 5, 2014, vol. 50, No. 12, pp. 899-891 (English translation).

R.M. Toroghi et al., "Multi-Channel Speech Separation with Soft Time-Frequency Masking" SAPA-SCALE Conference, Sep. 2012, 6 pages.

* cited by examiner

SOUND SIGNAL PROCESSING METHOD, AND SOUND SIGNAL PROCESSING APPARATUS AND VEHICLE EQUIPPED WITH THE APPARATUS

CROSS-REFERENCE TO RELATED APPLICATION(S)

This application claims the benefit of Korean Patent Application No. 2014-00125005, filed on Sep. 19, 2014 in the Korean Intellectual Property Office, the disclosure of which is incorporated herein by reference.

BACKGROUND

1. Field

Embodiments of the present disclosure relate to a sound signal processing method, a sound signal processing apparatus and a vehicle equipped with the apparatus.

2. Description of Related Art

A vehicle is a kind of transportation means that travels along a road or rails in a predetermined direction by rotating at least one wheel. Vehicles may include a three-wheeled or four-wheeled vehicle, a two-wheeled vehicle such as a motorcycle, construction equipment, a motorized bicycle, a bicycle, and a train traveling on rails.

A voice recognition apparatus configured to control various components and apparatus installed in a vehicle by recognizing a voice may be installed in a vehicle to support an operation of users including a driver or passenger. The voice recognition apparatus is a kind of apparatus to recognize a user's voice.

A device configured to receive a voice command, such as a microphone of a voice recognition apparatus, may receive not only a user voice command but also various noises, such as engine sound, voice of a passenger, etc. Therefore, for improvement of the voice recognition performance, the voice command by the user must be accurately extracted.

SUMMARY

Therefore, it is an aspect of the present disclosure to provide a sound signal processing method, a sound signal processing apparatus capable of reconstructing a target sound maximally by improving separation performance of each signal from mixed signals and a vehicle equipped with the apparatus.

It is another aspect of the present disclosure to provide a sound signal processing method, a sound signal processing apparatus capable of obtaining a target sound accurately by using relatively low computational burden when recognizing a sound through spatial filtering, and a vehicle equipped with the apparatus.

Additional aspects of the present disclosure will be set forth in part in the description which follows and, in part, will be obvious from the description, or may be learned by practice of the invention.

In accordance with one aspect of the present disclosure, a sound signal processing apparatus includes a spatial filtering unit configured to obtain a filtered signal including a target signal by spatial filtering by applying a spatial filter to an input signal and a mask application unit configured to obtain an output signal by applying a mask, which is obtained by using spatial selectivity between the target signal and target signal noise, to the filtered signal.

The mask application unit may calculate and obtain a directivity pattern of the target signal and a directivity pattern of the noise of the target signal by using the spatial filter.

The mask application unit may determine the spatial selectivity by using the directivity pattern of the target signal and the directivity pattern of the noise.

The spatial selectivity may include a ratio of the directivity pattern of the target signal to the directivity pattern of the noise.

The directivity pattern of the target signal may be calculated according to following equation 1.

$$D_{TE}(k,q)=\Sigma_{i=1}^{N}W_{TE}^{i}\exp[-j\omega_k(p_i-p_R)^Tq/c] \quad \text{Equation 1}$$

Herein, k represents a frequency bin index, q represents a unit normal directional vector, N represents the number of input signal, Wi(k) represents a spatial filter of a i-th signal, ωk represents a frequency corresponding to a k-th bin, pi represents a vector indicating a location of a sensor of a i-th signal, pR my represents a vector indicating a location of a reference sensor, and c represents the speed of sound.

The noise may be a main noise of the target signal.

The filtered signal may further include a non-target signal.

The spatial filter may include a target-extraction filter configured to obtain the target signal from the input signal and a target rejection filter configured to obtain the non-target signal from the input signal.

The mask application unit may calculate the directivity pattern of the target signal and the directivity pattern of the noise of the target signal and may determine the spatial selectivity based on the directivity pattern of the target signal and the directivity pattern of the noise.

The mask application unit may obtain the mask by using a ratio of a target signal of the filtered signal to a non-target signal of the filtered signal.

The mask may be calculated according to following equation 2.

$$M(k,\tau)=\frac{1}{1+F_R(\tau)\exp[-\alpha(\log R(k)+\beta)\log(SNR(k,\tau))]} \quad \text{Equation 2}$$

Herein, k represents a frequency bin index, τ represents a frame index, M(k,τ) represents a mask in k and τ, R(k) represents a spatial selectivity, SNR(k,τ) represents a ratio of a target signal to a non-target signal, and FR(τ) represents an inverse number of a ratio of a target signal to a non-target signal.

The sound signal processing apparatus may further include a converting unit for converting the input signal from the time domain into the frequency domain.

The converting unit may convert the input signal by using a Fourier Transform, a Fast Fourier Transform (FFT), or a Short-Time Fourier Transform (STFT).

The sound signal processing apparatus may further include an inverting unit inverting the output signal from the frequency domain into the time domain.

The spatial filtering unit may perform spatial filtering by using at least one of a beam-forming technique, the Independent Component Analysis (ICA) technique, the Independent Vector Analysis (IVA) technique and the Minimum power distortionless response (MPDR) technique.

In accordance with one aspect of the present disclosure, a sound signal processing method includes obtaining a filtered signal including a target signal by performing spatial filtering by applying a spatial filter to an input signal, obtaining a mask using by a spatial selectivity between the target signal and noise of the target signal and obtaining an output signal by applying the mask to the filtered signal.

The obtaining of a mask may include calculating a directivity pattern of the target signal and a directivity pattern of the nose of the target signal by using the spatial filter.

The obtaining of a mask may further include determining the spatial selectivity by using the directivity pattern of the target signal and the directivity pattern of the noise.

The filtered signal may further include a non-target signal.

The spatial filter may include a target-extraction filter configured to obtain a target signal from the input signal and a target rejection filter configured to obtain a non-target signal from the input signal.

The obtaining of a mask may include calculating the directivity pattern of the target signal and the directivity pattern of the nose of the target signal by using the target-extraction filter and determining the spatial selectivity based on the directivity pattern of the target signal and the directivity pattern of the nose.

The sound signal processing method may further include converting an input signal from the time domain into the frequency domain, and inverting an output signal from the frequency domain into the time domain.

In accordance with one aspect of the present disclosure, a vehicle includes an input unit receiving sound and outputting an input signal corresponding to the received sound, a signal processing unit obtaining a filtered signal by applying a spatial filter to the input signal, obtaining a mask by using spatial selectivity between a target signal of the filtered signal and a non-target signal of the filtered signal, and obtaining an output signal by applying the mask to the filtered signal, and an output unit outputting the output signal.

The vehicle may further include a control unit controlling components and devices in the vehicle by using the output signal.

The filtered signal may include a target signal and a non-target signal, and the spatial filter may include a target-extraction filter and a target rejection filter.

The signal processing unit may calculate a directivity pattern of the target signal and a directivity pattern of the noise of the target signal by using the target-extraction filter, and may determine the spatial selectivity based on the directivity pattern of the target signal and the directivity pattern of the noise.

The signal processing unit may obtain the mask by using a ratio of the target signal of the filtered signal to the non-target signal of the filtered signal.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Hereinafter, a sound signal processing apparatus according to one exemplary embodiment of the present disclosure may be described with reference to FIGS. 1 to 3.

Figure 1:
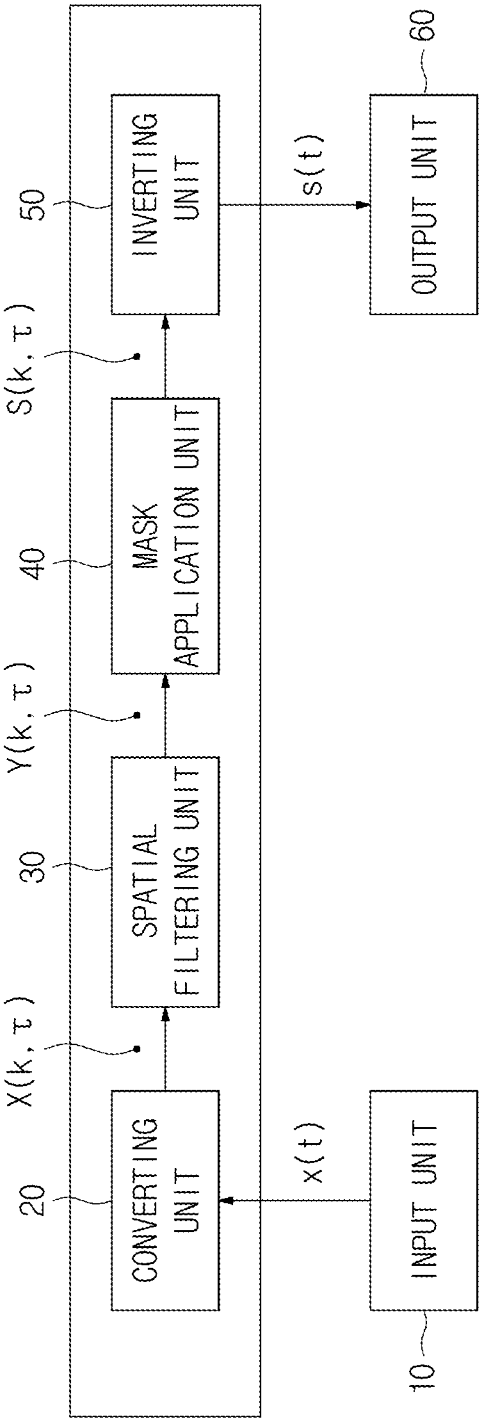
FIG. 1 is a block diagram illustrating a sound signal processing apparatus according to one exemplary embodiment of the present disclosure.
Figure 2:
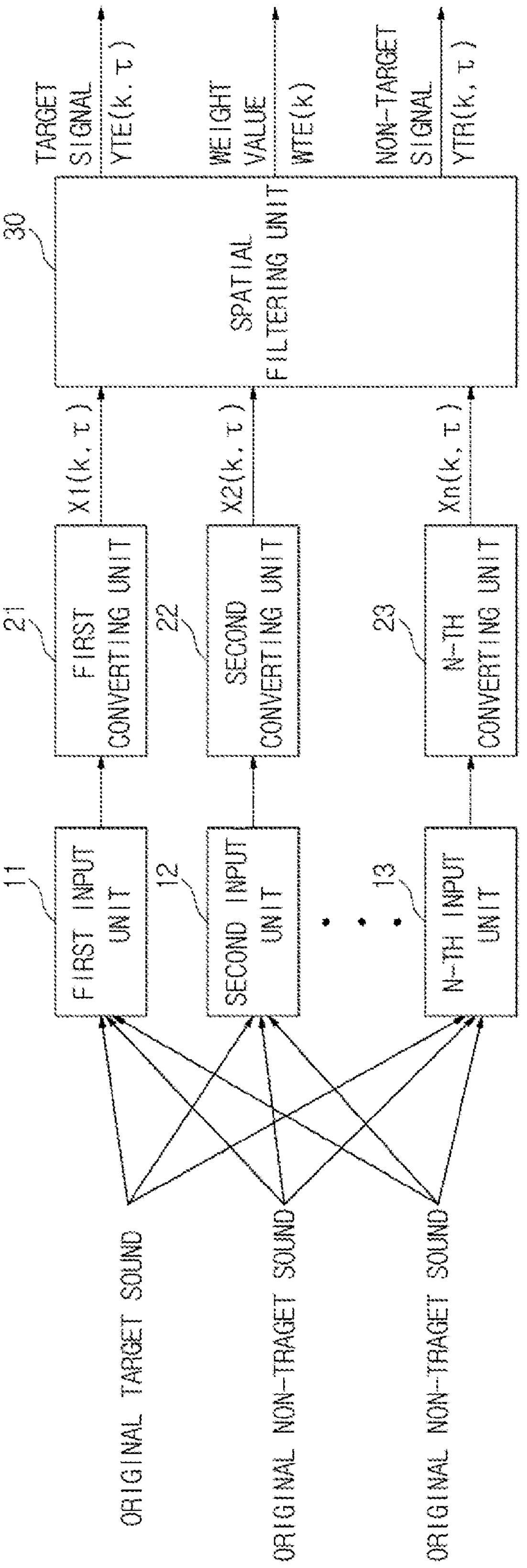
FIG. 2 is a block diagram illustrating a signal inputted in a spatial filtering unit.
Figure 3:
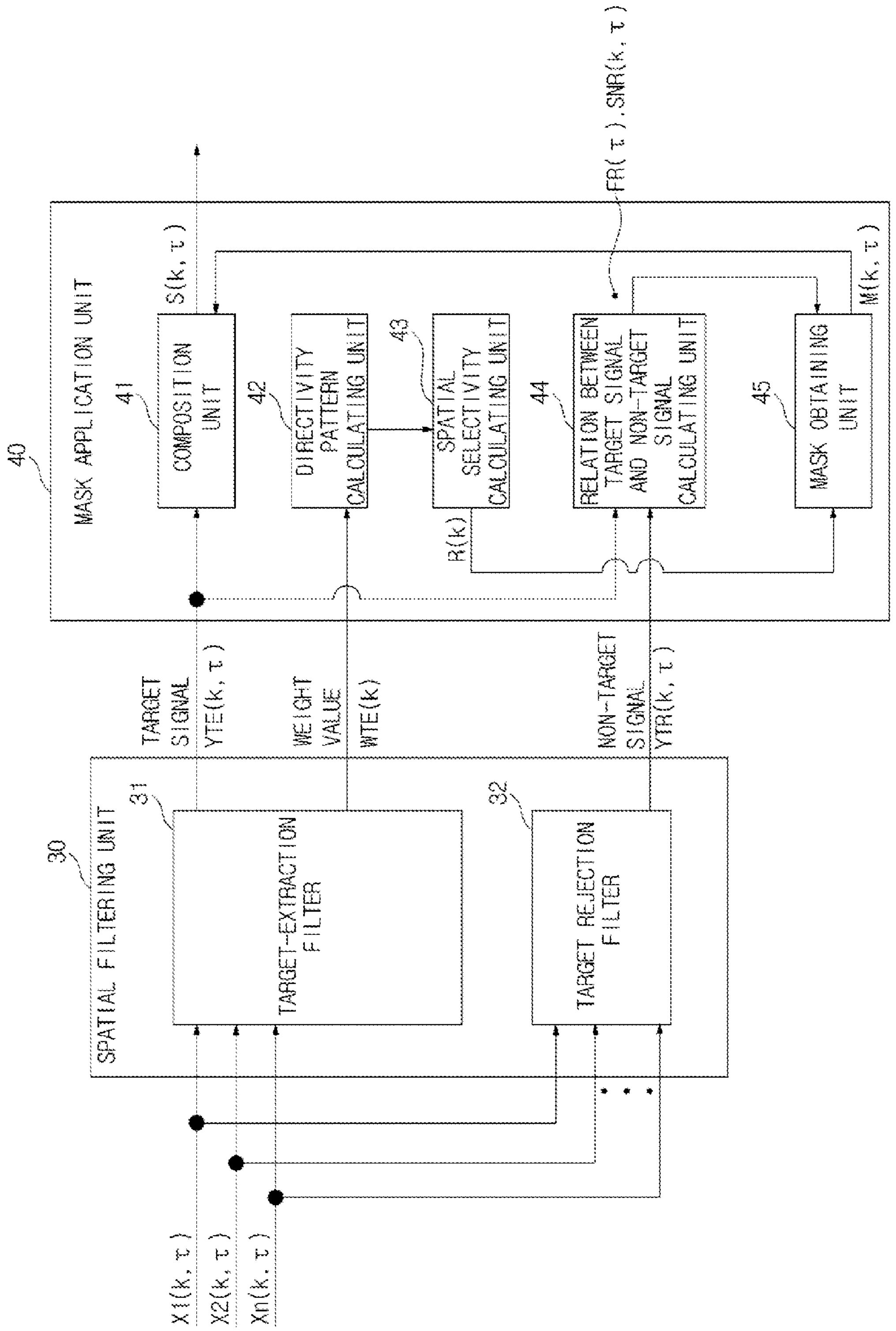
FIG. 3 is a block diagram illustrating the spatial filtering unit and a mask application unit.

FIG. 1 is a block diagram illustrating a sound signal processing apparatus according to the exemplary embodiment of the present disclosure, FIG. 2 is a block diagram illustrating a signal inputted in a spatial filtering unit, and FIG. 3 is a block diagram illustrating the spatial filtering unit and a mask application unit.

Referring to FIG. 1, a sound signal processing apparatus 1 may transmit or receive data x(t) or s(t) by being connected to an input unit 10 and an output unit 60. The sound signal processing apparatus 1 may transmit or receive data x(t) or s(t) by using at least one of the input unit 10 and the output unit 60, and wired communication realized by various cables, and by using at least one of the input unit 10 and the output unit 60, and Bluetooth, Wireless Fidelity (Wi-Fi), and Near Field Communication (NFC) or wireless communication using a mobile communication standard. In addition, the input unit 10, the sound signal processing apparatus 1 and the output unit 60 may be installed on the same printed circuit board, and data communication among the input unit 10, the output unit 60, and the sound signal processing apparatus 1 may be carried by circuitry on the printed circuit board.

The input unit 10 may receive sound from the outside and may output an electrical signal x(t) corresponding to the received sound. The input unit 10 may be realized in a microphone or a component corresponding to the microphone. The input unit 10 may include a transducer vibrating according to frequency of the outside sound and outputting an electrical signal corresponding to the vibration. In addition, the input unit 10 may further include at least one of an amplifier amplifying the signal, and an analog digital converter performing analog digital converting of the outputted electrical signal.

The outside sound inputted to the input unit 10 may include an original target sound, such as a voice command of a user, and a non-target sound, such as a voice command of a passenger other than that of the user, chatter or engine sound. The input unit 10 may receive separately the original target sound and the non-target sound through each microphone. The original target sound may further include noise from various sources, such as engine sound, fan rotation sound, and blowing sound of an air conditioner which are mixed with a voice command.

According to embodiments, the input unit 10 may include a first input unit 11 to a N-th input unit 13, as illustrated in FIG. 2. The input unit 10 may be implemented by a plurality of microphones or equivalent components. The input units 11 to 13 may receive an original target sound or an original non-target sound, respectively. The original target sound may be inputted to any one first input unit 11 among a plurality of input units 11 to 13, or a plurality of input units, such as the first input unit 11 and the second input unit 12, may simultaneously receive the original target sound. Moreover one input unit, such as the first input unit, 11 may receive a sound which is a mixture of the original target sound and the original non-target sound. Each input unit 11 to 13 may output and transmit an input signal x1(t) to xn(t) to converting units 21 to 23 corresponding to the input unit 11 to 13.

The output unit 60 may receive an inverse signal s(t) which is outputted from the sound signal processing apparatus 1 and corresponds to the original target sound. The output unit 60 may output a sound corresponding to the inverse signal s(t). The output unit 60 may be implemented by a speaker and may be omitted. For example, when an inverting unit 50 may generate a control signal to control an apparatus based on the signal s(t), the output unit 60 may be omitted and a processor related to controlling may replace the output unit 60. An apparatus may include various components and devices which are installed in a vehicle, or may be installed within the vehicle and a processor may perform a function of controlling various components and devices of a vehicle.

As illustrated in FIG. 1, the sound signal processing apparatus 1 may include a converting unit 20, a spatial filtering unit 30, a mask application unit 40 and an inverting unit 50. Some of these may be omitted according to a designer's choice. In addition to these configurations, other configurations may also be added according to the designer's choice. The addition and the omission may be carried out within a range that may be considered by those skilled in the art.

The input signal x(t) obtained at the input unit 10 may be a time-domain signal. The converting unit 20 may receive a time-domain signal x(t) and convert the time-domain signal x(t) to a frequency domain signal x(k,τ). k may represent frequency bin index, and τ may represent frame index. x(k,τ) obtained by the converting unit 20 may be transmitted to the spatial filtering unit 30. The converting unit 20 may be omitted according to embodiments.

According to one embodiment of the present disclosure, the converting unit 20 may covert a time-domain signal x(t) to a frequency domain signal x(k,τ) by using various transform techniques, such as Fourier Transform, Fast Fourier Transform (FFT), and Short-Time Fourier Transform (STFT), but is not limited thereto. Alternatively, the converting unit 20 may covert a time-domain signal x(t) to a frequency domain signal x(k,τ) by using various well-known transform techniques.

As illustrated in FIG. 2, when a plurality of input units 11 to 13 are provided, the sound signal processing apparatus 1 may include a plurality of converting units 21 to 23 corresponding to the plurality of input units 11 to 13. A first converting unit 21 to a N-th converting unit 23 may separately convert the output signals x1(t) to xn(t) outputted from the first input unit 11 to the N-th input unit 13, may obtain a converted plurality of signals x1(k,τ) to xn(k,τ), and may transmit the obtained signal x1(k,τ) to xn(k,τ) to the spatial filtering unit 30.

The spatial filtering unit 30 may obtain filtered signal YTE(k,τ) or YTR(k,τ) by using the converted signals x1(k,τ) to xn(k,τ), and may transmit the filtered signal YTE(k,τ) or YTR(k,τ) to the mask application unit 40.

Particularly, the spatial filtering unit 30 may perform spatial filtering by applying a spatial filter to the input signal x(t) outputted from the input unit 10 or the signal x(k,τ) outputted from the converting unit 20, and may obtain a filtered signal as a result of the spatial filtering. The filtered signal may include a target signal YTE(k,τ) and may further include a non-target signal YTR(k,τ).

As illustrated in FIG. 3, the spatial filtering unit 30 may include a target-extraction filter 31 and a target rejection filter 32. The spatial filtering unit 30 may obtain the target signal YTE(k,τ) by applying the target-extraction filter 31 to signals x1(k,τ) to xn(k,τ). In addition, The spatial filtering unit 30 may obtain the non-target signal YTR(k,τ) by applying the target rejection filter 32 to the signal x1(k,τ) to xn(k,τ).

According to embodiments, the spatial filtering unit 30 may perform spatial filtering by using at least one of a beam-forming technique, the Independent Component Analysis (ICA) technique, the Independent Vector Analysis (IVA) technique and the Minimum power distortionless response (MPDR) technique, and may obtain the target signal YTE(k,τ) and the non-target signal YTR(k,τ), as a result of the spatial filtering.

The beam forming technique is a technique for obtaining an output signal by correcting the time difference between signals of multiple channels inputted and gathering corrected signals of multiple channels. By using the beam-forming technique, the time difference between signals of multiple channels generated by a location of a transducer of the input unit 10 or an incident angle of an outside sound may be corrected by differently delaying each channel or not delaying a channel. In addition, by using the beam forming technique, the signals of the multiple channels may be gathered by applying a weight value to the corrected each signal of the multiple signals or without applying a weight The weight value applied to each of the multiple channels may be a fixed weight value or be varied in response to a signal.

The Independent Component Analysis (ICA) technique is a technique for separating a blind signal optimally by learning and updating repeatedly a weight value capable of maximizing the independence among output signals when it is assumed that multiple input signals are a weighted sum of the multiple signals that are independent from each other. An algorithm of the independent component analysis technique may include, Infomax, JADE or FastICA.

The Independent Vector Analysis (IVA) technique is a technique for learning a weight maximizing independence between output signals in the frequency domain. When inducing a non-linear function, a sequence and scale of output signals are prevented from being excessively different caused by independent component analysis in which signals are processed on each frequency band.

The Minimum power distortionless response (MPDR) technique a technique for deriving a spatial filter which is more general by introducing certain limitations (constraints). For example, a spatial filer to apply to input signals is obtained by using an input signal, a direction vector and a noise covariance, and output signals may be obtained by applying the obtained spatial filter to the input signal.

The Beam-forming technique, Independent Component Analysis (ICA) technique, Independent Vector Analysis (IVA) technique and Minimum power distortionless response (MPDR) technique, all of which are used in the spatial filtering unit 30, are known to skilled people in the art, and thus specific description will be omitted for the convenience. In addition, the beam-forming technique, Independent Component Analysis (ICA) technique, Independent Vector Analysis (IVA) technique and Minimum power distortionless response (MPDR) technique may be implemented by well-known methods and by modified various methods within a range that may be considered by those skilled in the art.

The spatial filtering unit 30 may perform spatial filtering by using the beam-forming technique, Independent Component Analysis (ICA) technique, Independent Vector Analysis (IVA) technique and Minimum power distortionless response (MPDR) technique, as mentioned above, but is not limited thereto. The spatial filtering unit 30 may perform a spatial filtering by various techniques that may be considered by those skilled in the art.

According to one embodiment of the present disclosure, the spatial filtering unit 30 may obtain a target signal YTE(k,T) or a non-target signal YTR(k,T) by using equation 1 and equation 2.

$$Y_{TE}(k,\tau)=W_{TE}(k)[X_1(k,\tau), \ldots, X_N(k,\tau)]^T \quad \text{Equation 1}$$

$$Y_{TR}(k,\tau)=W_{TR}(k)[X_1(k,\tau), \ldots, X_N(k,\tau)]^T \quad \text{Equation 2}$$

Herein, YTE(k,T) represents a target signal, k represents a frequency bin index and T represents a frame index. WTE(k) represents a vector consisting of coefficients of estimated target-extraction filter by a spatial filtering in k frequency bin. Here, the estimated target-extraction filter may be estimated by at least one of a beam-forming technique, Independent Component Analysis (ICA) technique, Independent Vector Analysis (IVA) technique and Minimum power distortionless response (MPDR) technique. Xk(k,T) represents a signal inputted to the spatial filtering unit 30. In addition, N represents the number of input signals, and subscripts 1 to N added to x may be an index for representing each input signal inputted to the number of N channels.

The spatial filtering unit 30 may be implemented by a code generated by at least one equation between equation 1 and equation 2. The code for implementation of the spatial filtering unit 30 may vary according to a designer.

As illustrated in FIGS. 2 and 3, the spatial filtering unit 30 may output the target signal YTE(k,T) and the non-target signal YTR(k,T) and transmit the target signal YTE(k,T) and the non-target signal YTR(k,T) to the mask application unit 40. In addition, as illustrated in FIG. 3, the spatial filtering unit 30 may transmit estimated weight value WTE(k) estimated by using various techniques, as mentioned above, to the mask application unit 40.

The mask application unit 40 may apply the target signal YTE(k,T) transmitted from the spatial filtering unit 30 to a mask and may obtain output signals s(k,T).

As illustrated in FIG. 3, the mask application unit 40 may include a composition unit 41, a directivity pattern calculating unit 42, a spatial selectivity calculating unit 43, a relation between a target signal and a non-target signal calculating unit 44, and a mask obtaining unit 45.

The composition unit 41 may apply a mask, such as a soft mask, to the target signal YTE(k,T) and may generate output signals s(k,T). The composition unit 41 may be implemented by a code generated based on equation 3. The code for the implementation of the composition unit 41 may be various according to a designer $$S(k,\tau)=M(k,\tau)Y_{TE}(k,\tau) \quad \text{Equation 3}$$

Herein, S(k,T) represents an obtained output signal, and M(k,T) represents a weight value of the soft mask. YTE(k,T) represents the target signal, as mentioned above.

In other words, the composition unit 41 may obtain the output signal S(k,T) by composing a mask M(k,T) and the target signal YTE(k,T). The target signal YTE(k,T) may be transmitted from the spatial filtering unit 30. The mask M(k,T) may be transmitted from the mask obtaining unit 45.

According to one embodiment of the present disclosure, the directivity pattern calculating unit 42 may calculate a parameter related to directivity of a filter. Here, the parameter related to a direction of a filter may include a directivity pattern DTE(k,q). The directivity pattern DTE(k,q) may be data related to a directivity of a filter applied to input signals x1(t) to xn(t) in the spatial filtering unit 30. According to one embodiment of the present disclosure, the directivity pattern DTE(k,q) may include a set of values related a directivity of the target-extraction filter 31 applied to the target signal YTE(k,T).

For example, a directivity pattern may be defined as equation 4.

$$D_{TE}(k,q)=\Sigma_{i=1}^{N} W_{TE}^{i}\exp[-j\omega_k(p_i-p_R)^T q/c] \quad \text{Equation 4}$$

Herein, DTE(k,q) represents a directivity pattern related to the target signal YTE(k,T)) of q. In addition, k represents a frequency bin index, q represents a unit normal directional vector, i represents an input signal index, and N represents the number of input signal. WTEi(k) represents a spatial filter of a i-th signal, and wk represents a frequency corresponding to a k-th bin. Pi represents a vector indicating a location of a input unit in which a i-th signal is inputted, pR represents a vector indicating a location of a reference input unit used for a location reference of a input unit, such as a reference sensor. c represents the speed of sound.

The directivity pattern DTE(k,q) may be defined as equation 5.

$$D_{TE}(k,q)=\Sigma_{i=1}^{N} Wi_{TE}^{i}\exp[-j\omega_k d \sin\theta/c] \quad \text{Equation 5}$$

Herein, i represents a distance between a vector of a input unit in which a i-th signal is inputted, and a vector of a reference input unit. sin θ represents an angle between a vector of a input unit in which a i-th signal is inputted, and a vector of a reference input unit.

A directivity pattern DTE(k,q) may be defined in various ways as well as by equations 4 and 5, as mentioned above.

The directivity pattern calculating unit 42 may be implemented by a code allowing the calculation of the directivity pattern DTE(k,q) to be performed according to equations 4 and 5, as mentioned above, and the code may be various codes according to designer preference.

The directivity pattern calculating unit 42 may calculate a directivity pattern DTE(k,qT) of the target signal YTE(k,T) by using a unit normal directional vector qT corresponding to the target signal when calculating the directivity pattern DTE(k,q) by using a unit normal directional vector q, and may separately calculate a directivity pattern of a noise DTE(k,qN) remaining in the target signal YTE(k,T) by using a unit normal directional vector qN corresponding to the noise of a target signal.

The directivity pattern DTE(k,q), the directivity pattern DTE(k,qT) of target signal YTE(k,T) and the directivity pattern of noise DTE(k,qN), all of which are calculated in the directivity pattern calculating unit 42, may be transmitted to the spatial selectivity calculating unit 43 and may be provided to calculate a parameter, such as a spatial selectivity R(k).

The spatial selectivity calculating unit 43 may obtain a parameter expressed as spatial selectivity R(k) by using the directivity pattern DTE(k,qT) of target signal YTE(k,T) and the directivity pattern of the noise included in the target signal. Here, the spatial selectivity R(k) may include a ratio of the directivity pattern of target signal to the directivity pattern of noise. Particularly, the spatial selectivity R(k) may be defined as in equation 6.

$$R(k) = \frac{|D_{TE}(k, q_T)|}{|D_{TE}(k, q_N)|} \quad \text{Equation 6}$$

Herein, qT represents a unit normal directional vector corresponding to a target signal, qN represents a unit normal directional vector corresponding to a noise of a target signal, DTE(k,qT) represents a directivity pattern of target signal YTE(k,τ), and DTE(k,qN) represents a directivity pattern of noise remained a target signal YTE(k,τ). Here, the noise may be a dominant noise in the target signal.

A value that is known a priori may be used as the unit normal directional vector qT corresponding to the target signal and the unit normal directional vector qN corresponding to the noise of the target signal. For example, the unit normal directional vector qT corresponding to the target signal and the unit normal directional vector qN corresponding to the noise of the target signal may be a unit normal directional vector used in a spatial filtering algorithm, such as a beam forming technique. If spatial filtering may be performed by using the Independent Component Analysis (ICA) technique, a unit normal directional vector qT corresponding to the target signal and a unit normal directional vector qN corresponding to the noise of the target signal may be calculated by detecting a direction corresponding to one or more minimum values of a directivity pattern of an estimated filter.

The spatial selectivity R(k) may be an indicator indicating how much noise is removed in the target signal YTE(k,τ). Particularly, when the spatial selectivity R(k) may have a relative large value, noise remaining in the target signal YTE(k,τ) may be sufficiently removed. However, when the spatial selectivity R(k) may have a relative small value, noise remaining in the target signal YTE(k,τ) may not be sufficiently removed and thus more noise may be needed to be removed.

The spatial selectivity calculating unit 43 may be implemented by a code allowing calculation of the spatial selectivity R(k) to be performed according to equation 6, as mentioned above, and the code may be various ones according to designer's choice.

As illustrated in FIG. 3, the spatial selectivity R(k) calculated in the spatial selectivity calculating unit 43 may be transmitted to the mask obtaining unit 45.

Meanwhile, the relation between a target signal and a non-target signal calculating unit 44 may receive the target signal YTE(k,τ) and the non-target signal YTR(k,τ), and may calculate a certain parameter by using the target signal YTE(k,τ) and the non-target signal YTR(k,τ). The certain parameter may indicate information of a relationship between the target signal YTE(k,τ) and the non-target signal YTR(k,τ). The information of a relationship between the target signal YTE(k,τ) and the non-target signal YTR(k,τ) may include a ratio of the target signal YTE(k,τ) to the non-target signal YTR(k,τ).

Particularly, the ratio SNR(k,τ)) of the target signal YTE (k,τ) to the non-target signal YTR(k,τ) may be defined as in equation 7.

$$SNR(k, \tau) = \frac{|Y_{TE}(k, \tau)|}{|Y_{TR}(k, \tau)| + \varepsilon} \quad \text{Equation 7}$$

Herein, SNR(k,τ) represents a ratio of the target signal YTE(k,τ) to the non-target signal YTR(k,τ), YTE(k,τ) represents the target signal, YTR(k,τ) represents the non-target signal. ϵ is a value to prevent a denominator to become 0. ϵ may have a small arbitrary positive number.

The relation between a target signal and a non-target signal calculating unit 44 may be used to calculate an inverse ratio FR of the target signal to the non-target signal which is an inverse ratio of the target signal to the non-target signal. The inverse ratio FR of the target signal to the non-target signal may include an inverse ratio FR(τ) of a target signal to a non-target signal of any one of frame τ.

The inverse ratio FR(τ) of the target signal to the non-target signal of any one of frame τ may be obtained through equation 8.

$$F_R(\tau) = \frac{\Sigma_k |Y_{TR}(k, \tau)|}{\Sigma_k |Y_{TE}(k, \tau)|} \quad \text{Equation 8}$$

In equation 8, τ represents a frame index, and FR(τ) represents an inverse ratio of a target signal to a non-target signal of a frame τ. YTE(k,τ) represents a target signal, and YTR(k,τ) represents a non-target signal.

Since a sound including an original target sound and a non-target sound may have a dependency on a frequency, in any one frame, dominance of a target sound and a noise of time-frequency component may have a similar tendency. Therefore, an inverse ratio FR(τ) of a target signal to a non-target signal in any one frame τ may consider information of another frequency bin in any one frame so that the inverse ratio FR(τ) of a target signal to a non-target signal in any one frame τ may be used to control a degree of suppression of remaining noise in the target signal YTE(k,τ) which may be determined by the ratio SNR(k,τ) of a target signal to a non-target signal and the spatial selectivity R(k).

The relation between a target signal and a non-target signal calculating unit 44 may be implemented by a code allowing the ratio SNR(k,τ) of a target signal to a non-target signal by using equation 7, as mentioned above, to be obtained and the inverse ratio FR(τ) of a target signal to a non-target signal by using equation 8 to be calculated. The code may be various codes according to designer preference.

The ratio SNR(k,τ) of a target signal to a non-target signal and the inverse ratio FR(τ) of a target signal to a non-target signal, both of which are obtained in the relation between a target signal and a non-target signal calculating unit 44, may be transmitted to the mask obtaining unit 45.

The mask obtaining unit 45 may obtain a mask M(k,τ) by using various parameters, and may transmit the mask M(k,τ) to the composition unit 41.

According to one embodiment of the present disclosure, the mask obtaining unit 45 may obtain the mask M(k,τ) by using the spatial selectivity transmitted from the spatial selectivity calculating unit 43, the ratio SNR(k,τ) of a target signal to a non-target signal and the inverse ratio FR(τ) of a target signal to a non-target signal transmitted from the relation between a target signal and a non-target signal calculating unit 44.

The mask obtaining unit 45 may calculate and obtain a mask M(k,τ) by using a code to be applied to equation 9.

$$M(k, \tau) = \frac{1}{1 + F_R(\tau)\exp[-\alpha(\log R(k) + \beta)\log(SNR(k, \tau))]} \quad \text{Equation 9}$$

Herein, M(k,τ) represents a mask, FR(τ) represents an inverse ratio of a target signal to a non-target signal, and SNR(k,τ) represents a ratio of a target signal to a non-target signal. R(k) represents a spatial selectivity. α and β represent an inclination of sigmoid function and a parameter deciding bias of log of a spatial selectivity, respectively. α and β may be determined according to designer's choice.

The mask obtaining unit 45 may be implemented by a code allowing a mask M(k,τ) to be calculated and obtained through equation 9. The code may be various codes according to designer's choice.

As mentioned above, the composition unit 41 may obtain an output signal s(k,τ) by composing the target signal YTE(k,τ) obtained in the spatial filtering unit 30 and the mask M(k,τ) obtained in the mask obtaining unit 45. Therefore, the mask application unit 40 may output a signal strengthening the YTE(k,τ).

The output signal s(k,τ) may be transmitted to the inverting unit 50.

The inverting unit 50 may obtain an inverse signal s(t) by inverting the output signal s(k,τ). The inverting unit 50 may invert a frequency domain signal into a time domain signal. The inverting unit 50 may obtain the inverse signal s(t) by using inverting techniques corresponding to converting techniques used in the converting unit 20. For example, the inverting unit 50 may obtain the inverse signal s(t) by using Inverse Fourier Transform or Inverse Fast Fourier Transform.

Therefore, by using the sound signal processing apparatus 1, a sound in which an original target sound among original sound is enhanced and a noise is removed may be obtained.

The converting unit 20, the spatial filtering unit 30, the mask application unit 40, and the inverting unit 50 included in the sound signal processing apparatus 1, as mentioned above, may be implemented by one or more processors. According to one embodiment of the present disclosure, by using one processor, the converting unit 20, the spatial filtering unit 30, the mask application unit 40, and the inverting unit 50 may be implemented. In this case, a processor may be capable of loading a program including a certain code to perform a function of the converting unit 20, the spatial filtering unit 30, the mask application unit 40, and the inverting unit 50, and may include a processor programmed by a certain code. According to another embodiment of the present disclosure, the converting unit 20, the spatial filtering unit 30, the mask application unit 40, and the inverting unit 50 may be implemented by using a plurality of processors. In this case, the converting unit 20, the spatial filtering unit 30, the mask application unit 40, and the inverting unit 50 may be implemented by a plurality of processor corresponding to each component. In addition, the plurality of processor may be a processor configured to load a program including a certain code performing each function, or may be a processor programmed by using a certain code.

Hereinafter, according to one embodiment, a vehicle provided with a sound signal processing apparatus may be described with reference to FIGS. 4 and 5.

Figure 4:
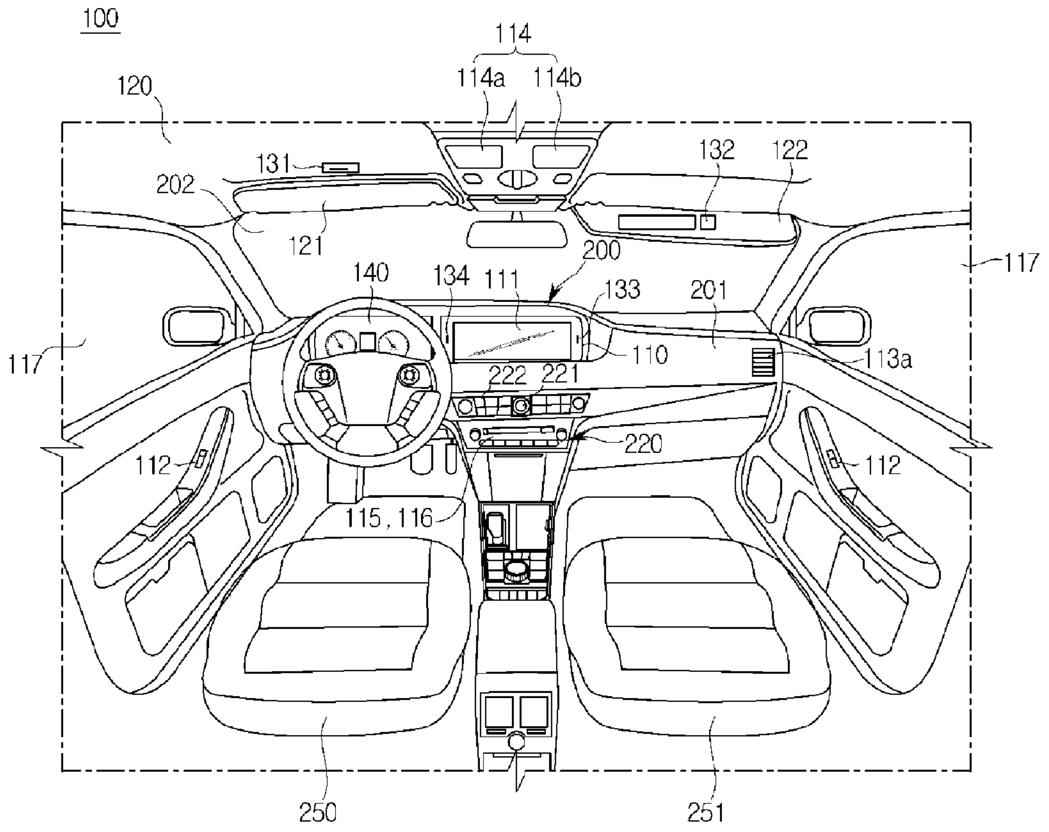
FIG. 4 is a view illustrating an interior of a vehicle according to the exemplary embodiment of the present disclosure.

FIG. 4 is a view illustrating an interior of a vehicle according to the embodiment of the present disclosure.

As illustrated in FIG. 4, a vehicle 100 may be provided with a dash board 200 to divide into an interior of the vehicle and an engine room. The dash board 200 may be disposed on the front of a driver seat 250 and a passenger seat 251, and may be provided with various components to help driving. The dash board 200 may include an upper panel 201, a center fascia 220 and a gear box 230. The upper panel 201 of the dash board 200 may be closed to a wind shield 202 and may be provided with a blowing port 113*a* of an air conditioning device 113, a glove box or various gauge boards 140.

A navigation unit 110 may be disposed on the dash board 200. For example, the navigation unit 110 may be installed on an upper portion of the center fascia 220. The navigation unit 110 may be embedded in the dash board 200 or may be installed on an upper surface of the upper panel 201 by using a device including a certain frame. One or more input unit 133 and 134 configured to receive a drivers' voice or a passengers' voice may be installed on a housing 111 of the navigation unit 110. The input unit 133 and 134 may be realized by a microphone.

The center fascia 220 of the dash board 200 may be connected to the upper panel 201. Input devices 221 and 222, such as a touch pad or buttons, to control the vehicle, a radio 115, a sound output apparatus 116, such as a compact disc player, may be installed on the center fascia 220

A processor 99 configured to control various components and devices of the vehicle may be installed on the inside of the dash board 200. The processor 99 may be realized by at least one of at least one semi-conductor chip, a switcher, an integrated circuit, a resistor, a volatile memory or a non-volatile memory, and a printed circuit board. The semi-conductor chip, the switcher, the integrated circuit, the resistor, the volatile memory or the nonvolatile memory may be disposed on the printed circuit board.

On the inner surface of the upper frame forming a ceiling of the vehicle 100, one or more input units 131 configured to receive a drivers' voice or a passengers' voice may be provided. The input unit 131 may be realized by a microphone. The input unit 131 may be electrically connected to the processor 99 provided on the inside of the dash board 200 or the navigation unit 110 by using a cable, and may transmit a received voice signal to the processor 99. In addition, the input unit 131 and 132 may be electrically connected to the processor 99 provided on the inside of the dash board 200 or the navigation 110 by using a wireless communication, such as a Bluetooth or Near Field Communication (NFC) unit, and may transmit a voice signal received by the input unit 131 to the processor 99.

Sun visors 121 and 122 may be installed on the inner surface of the upper frame of the vehicle 100. One or more input unit 132 configured to receive a drivers' voice or a passengers voice may be installed on the sun visors 121 and 122. The input unit 132 of the sun visors 121 and 122 may be realized by a microphone. The input unit 132 of the sun visors 121 and 122 may be electrically connected to the processor 99 provided on the inside of the dash board 200 or the navigation 110 by using a wired and/or a wireless interface.

At the interior of the vehicle, a locking device 112 may be installed to lock a door 117 of the vehicle. In addition, a lighting device 114 may be provided on the inner surface of the upper frame of the vehicle 100.

Figure 5:
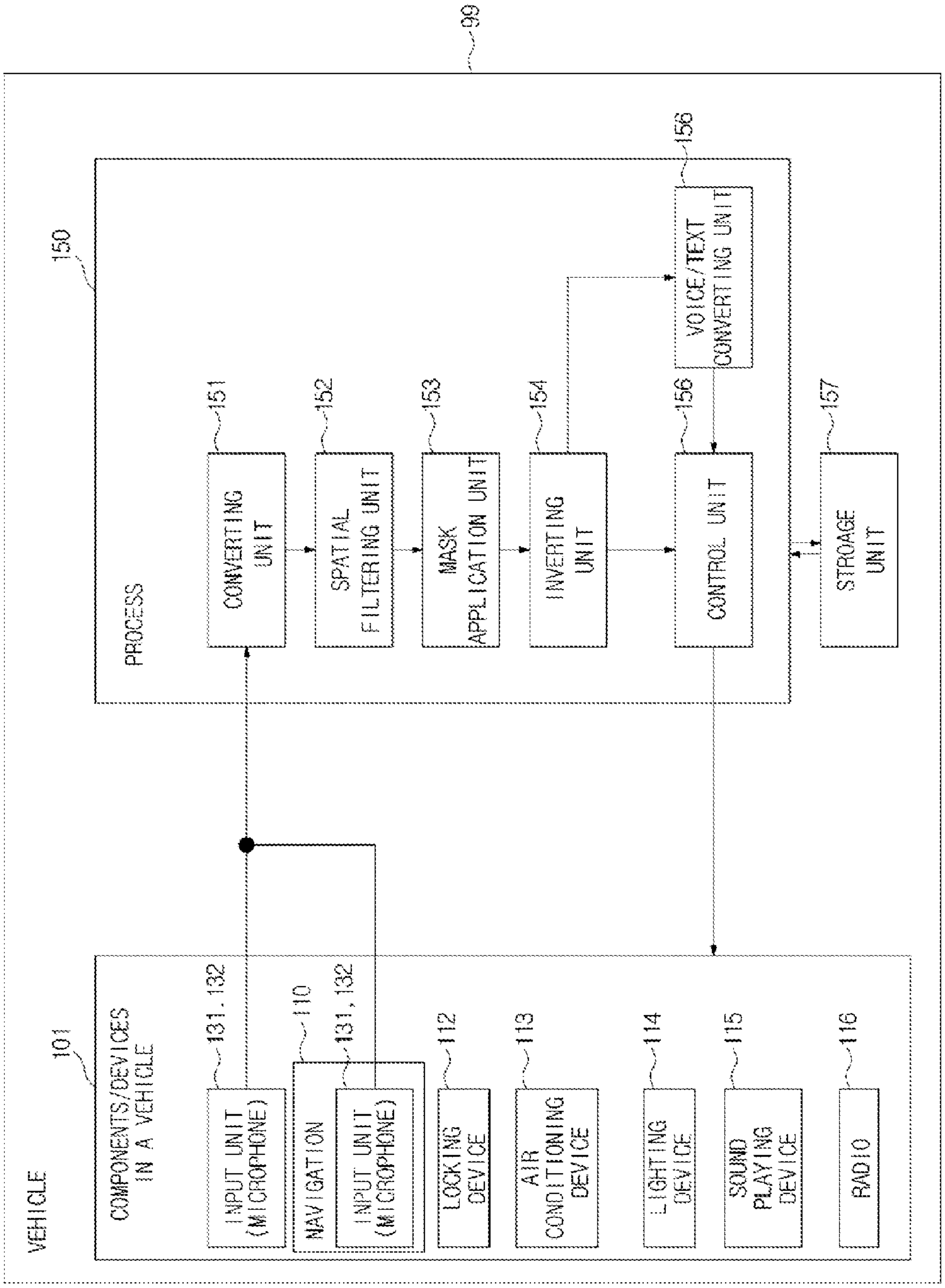
FIG. 5 is a block diagram of the vehicle according to the exemplary embodiment of the present disclosure.

FIG. 5 is a block diagram of the vehicle according to the embodiment of the present disclosure.

As illustrated in FIG. 5, the vehicle 100 may include components/devices in a vehicle 101, a processor 99 and a storage unit 157. As illustrated in FIG. 4, the components/devices in a vehicle 101 may include the input unit 131 and 132 realized by a microphone, the navigation 110 unit provided with the input unit 133 and 134, the locking device 112, the air conditioning device 113, the lighting device 114, a sound playing unit 115, and the radio 116, but is not limited thereto. The components/devices in a vehicle 101 may include various components and devices.

The input unit 131 to 134 may receive a drivers' voice or a passengers' voice and may output a sound signal which is an electrical signal corresponding to the receive voice. The sound signal may be an analog signal and in this case, the sound signal may be converted into a digital signal by passing through an analog-digital converter before being transmitted to the processor. The outputted sound signal may be amplified by an amplifier as occasion demands. The outputted sound signal may be transmitted to the processor 99.

As illustrated in FIG. 4, the input unit 131 and 132 may be provided on the inner surface of the upper frame of the vehicle 100 or the sun visors 121 and 122. Furthermore, the input unit 131 and 132 may be provided on a steering wheel. In addition, the input unit 131 and 132 may be provided on various places where the drivers' voice or the passengers voice may be received. In addition, microphones 133 and 134 may be installed on the navigation 110, as mentioned above.

A sound signal inputted through the input unit 131 to 134 may include signals caused by a plurality of sounds having different origins. For example, the driver and the passenger may simultaneously or sequentially input a voice command through the same or different input unit 131 to 134. In addition, the input unit 131 to 134 may be receive another sounds, such as an engine sound, wind noise entering through a window, chatter with a passenger. Therefore, the sound signal inputted through the input unit 131 to 134 may be mixed with a target sound signal corresponding to an original target sound which is a voice command and a non target sound signal corresponding to an original non-target sound which is not a voice command.

The processor 99 may receive a sound signal inputted through the input unit 131 to 134, may generate a control command by processing the received sound signal and then may control the components/devices in a vehicle 101 by using the generated control command.

The processor 99 may be implemented by one or more semiconductors.

The processor 99 may include a converting unit 151, a spatial filtering unit 152, a mask application unit 13, an inverting unit 154, a voice/text converting unit 155, and a control unit 156. The converting unit 151, the spatial filtering unit 152, the mask application unit 13, the inverting unit 154, the voice/text converting unit 155, and the control unit 156 may be physically separated or virtually separated. When the converting unit 151, the spatial filtering unit 152, the mask application unit 13, the inverting unit 154, the voice/text converting unit 155, and the control unit 156 may be physically separated, each of the converting unit 151, the spatial filtering unit 152, the mask application unit 13, the inverting unit 154, the voice/text converting unit 155, and the control unit 156 may be implemented by separate processors. When the converting unit 151, the spatial filtering unit 152, the mask application unit 13, the inverting unit 154, the voice/text converting unit 155, and the control unit 156 may be virtually separated, the converting unit 151, the spatial filtering unit 152, the mask application unit 13, the inverting unit 154, the voice/text converting unit 155, and the control unit 156 may be implemented by one processor and each of the converting unit 151, the spatial filtering unit 152, the mask application unit 13, the inverting unit 154, the voice/text converting unit 155, and the control unit 156 may be implemented by a program formed by at least one code.

The converting unit 151 may convert a time domain signal into a frequency domain signal. The converting unit 151 may convert a time domain signal into a frequency domain signal by using various techniques, such as Fourier Transform, Fast Fourier Transform or short-time Fourier Transform. The converting unit 151 may be omitted according to embodiments.

The spatial filtering unit 152 may obtain a filtered signal by using a signal inputted through the input unit 131 to 134 or a converted signal in the converting unit 151, and may transmit the filtered signal to the mask application unit 153.

According to one embodiment, the spatial filtering unit 152 may perform spatial filtering by using various techniques, such as a beam-forming technique, the Independent Component Analysis (ICA) technique, the Independent Vector Analysis (IVA) technique and the Minimum power distortionless response (MPDR) technique. As a result of spatial filtering, the spatial filtering unit 152 may obtain a target signal corresponding to a target sound signal and the non-target signal corresponding to a non-target sound signal.

The spatial filtering unit 152 may obtain a target signal and a non-target signal through equations 1 and 2. The spatial filtering unit 152 may be implemented by a code formed based on at least one of the equations 1 and 2. The code may be various codes according to designer's choice.

The mask application unit 153 may obtain an output signal in which a noise is removed or reduced by applying a mask, such as a soft mask to a target signal, and may transmit the output signal to the inverting unit 154.

The mask application unit 153 may obtain a directivity pattern which is a parameter related to a directivity of a filter. The mask application unit 153 may obtain the directivity pattern by using a code formed based on equation 4 or 5. According to embodiments, the mask application unit 153 may obtain a directivity pattern of a target signal or a directivity pattern of noise. The mask application unit 153 may obtain the directivity pattern of a target signal or the directivity pattern of noise of a target signal by using the spatial filter.

The mask application unit 153 may obtain spatial selectivity which is a parameter to indicate that how much noise is removed by using a directivity pattern, such as the directivity pattern of a target signal or the directivity pattern of noise. The spatial selectivity may be defined as a ratio of the directivity pattern of a target signal to the directivity pattern of noise. The mask application unit 153 may calculate the spatial selectivity by using a code formed based on equation 6. The code may be various codes according to designer's choice.

The mask application unit 153 may calculate a relationship between a target signal and a non-target signal. The relationship between the target signal and the non-target signal may be expressed as a ratio, and may be calculated through equation 7. The mask application unit 153 may calculate the relationship between the target signal and the non-target signal by using a code formed based on equation 7. The code may be various codes according to designer's choice.

The mask application unit 153 may obtain an inverse ratio by calculating an inverse number of a ratio of the target signal and the non-target signal. The inverse ratio of a target signal and a non-target signal may be obtained by using equation 8. The mask application unit 153 may calculate the inverse ratio of a target signal and a non-target signal by using a code formed based on equation 8. The code may be various codes according to designer's choice.

The mask application unit 153 may obtain a mask to be applied to the target signal by using spatial selectivity, the ratio of a target signal to a non-target signal, and the inverse ratio of a target signal to a non-target signal. In this case, the mask may be obtained by using equation 9. The mask application unit 153 may obtain the mask by using a code formed based on equation 9 and variously formed according to designer's choice.

The mask application unit 153 may generate an output signal by applying the mask of the target signal to the target signal. In this case, the mask application unit 153 may apply the mask of the target signal to the target signal by using a code formed based on equation 3.

The inverting unit 154 may invert a target signal applied to the mask outputted from the mask application unit 153 by using Inverse Fast Fourier Transform. Therefore, a voice signal corresponding to a target signal may be obtained. A signal outputted from the inverting unit 154 may be transmitted to the control unit 156 through the voice/text converting unit 155 or may be directly transmitted to the control unit 156 without passing through the voice/text converting unit 155.

The voice/text converting unit 155 may convert a voice signal into a text signal by using Speech-To-Text (STT) technique. The text signal may be transmitted to the control unit 156. The voice/text converting unit 155 may be omitted.

The control unit 156 may generate a control command corresponding to a voice command by a user by using a signal outputted from the inverting unit 154 or a text signal outputted from the voice/text converting unit 155, and may control target components or devices by transmitting the generated control command to target components or devices among the components/devices in a vehicle 101. Since a voice command corresponding to the target signal may be clearly classified by a sound signal processing unit 150 of the processor 99, the control unit 156 may generate one or more control commands corresponding to one or more voice commands by a user. Therefore, the control unit 156 may accurately control the components/devices in a vehicle 101 according to the requirements of a user.

The storage unit 157 may store various settings or information related to the components/devices in a vehicle 101. The processor 99 or the components/devices in a vehicle 101 may perform certain operations by reading the setting or information stored in the storage unit 157.

Figure 6:
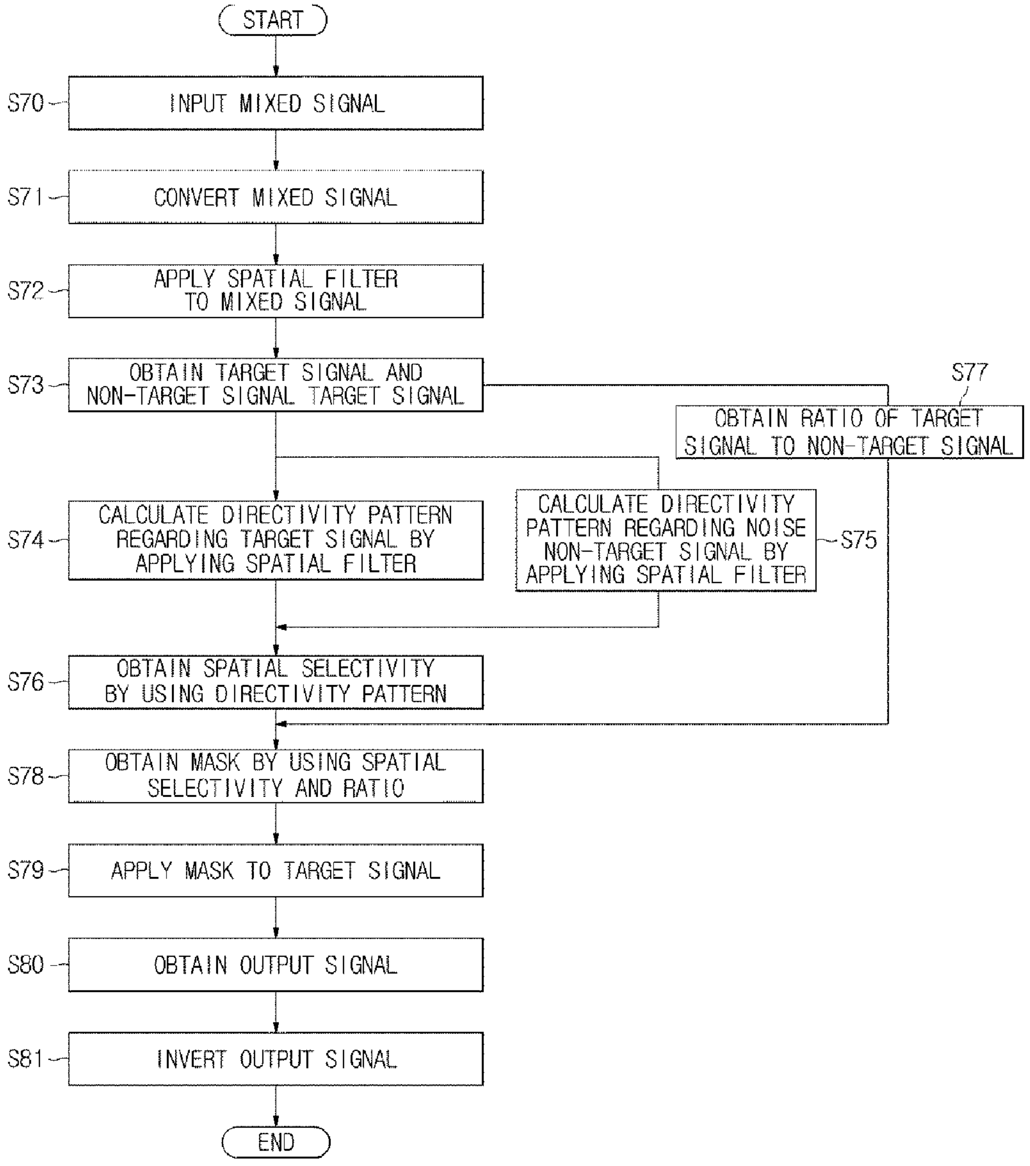
FIG. 6 is a control flowchart illustrating a sound signal processing method according to the exemplary embodiment of the present disclosure.

Hereinafter, a sound signal processing method according to one embodiment will be described with reference to FIG. 6. FIG. 6 is a control flowchart illustrating a sound signal processing method according to an embodiment of the present disclosure.

As illustrated in FIG. 6, a mixed signal in which an original target sound and an original non-target sound are mixed may be inputted through the input unit, such as one or more microphone S 70. If the mixed signal is an analog signal, the mixed signal may be converted into a digital signal by an analog-digital converter. In addition, the mixed signal may be amplified by an amplifier as occasion demands.

A processor loading a program or being programmed to process a sound signal may convert a time domain signal into a frequency domain signal to easily process a signal S 71. According to embodiments, a time domain signal may be converted into a frequency domain signal by using various techniques, such as, Fourier Transform, Fast Fourier Transform or short-time Fourier Transform.

The processor may apply a spatial filter to the mixed signal which is converted into a frequency domain signal S 72, and may obtain a target signal and a non-target signal S 73. In this case, the application of the spatial filter may be performed by using various techniques, such as a beamforming technique, the Independent Component Analysis (ICA) technique, the Independent Vector Analysis (IVA) technique and the Minimum power distortionless response (MPDR) technique. Equations 1 and 2 may be used to apply the spatial filter.

When the target signal is obtained. S 73, a directivity pattern regarding a target signal and a directivity pattern of a noise regarding a target signal may be calculated by applying the spatial filter, S 74 and S 75. Here, the directivity pattern of the target signal and the directivity pattern of the noise of the target signal may be performed by using the spatial filter. Each directivity pattern may be calculated by using equations 4 or 5.

A spatial selectivity indicating that how much noise is removed ray be calculated by using the directivity pattern of the target signal and the directivity pattern of the noise S 76. The spatial selectivity may be defined as a ratio of the directivity pattern of the target signal to the directivity pattern of the noise. The spatial selectivity may be calculated through equation 6.

When the target signal and the non-target signal are obtained in S 73, a parameter of the target signal and the non-target signal may be obtained by using the target signal and the non-target signal, S 77. The parameter of the target signal and the non-target signal may include information related to a relationship between the target signal and the non-target signal. The information related to the relationship between the target signal and the non-target signal may include a ratio of the target signal to the non-target signal, and an inverse ratio of the target signal to the non-target signal. The ratio of the target signal to the non-target signal, and the inverse ratio of the target signal to the non-target signal may be obtained through equations 7 and 8.

When the spatial selectivity, the ratio of the target signal to the non-target signal, and the inverse ratio of the target signal to the non-target signal are obtained, a mask may be obtained by using the spatial selectivity, the ratio of the target signal to the non-target signal, and the inverse ratio of the target signal to the non-target signal S 78. The mask may be obtained through equation 9.

When the mask is obtained, the mask may be applied to the target signal, as illustrated in FIG. 3. S79. Therefore, an output signal may be obtained, S 80.

The output signal may be inverted, S 81, and thus a voice signal corresponding to the target signal may be obtained.

As is apparent from the above description, according to the proposed method and apparatus for sound signal processing, and vehicle equipped with the apparatus, a target sound, such as a voice command by a user, may be maximally reconstructed while a mixed sound in which a voice command of a user and various noise, mixed together, may be accurately divided into each sound.

In addition, when recognizing a sound by using spatial filtering, the target sound may be accurately obtained by imposing a relative low amount of computational burden so that efficiency may be created by using little resource.

A voice command from a user may be accurately recognized so that components and devices in the vehicle may be more accurately controlled by the voice command from the user.

Therefore, according to the disclosure, the sound signal processing method, sound signal processing apparatus and vehicle equipped with the apparatus, the components and device in the vehicle may be controlled according to requirements of a user so that reliability of voice recognition apparatus and user convenience may be improved. In addition, safer driving may result.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A sound signal processing apparatus comprising:

a spatial filter configured to obtain a filtered signal including a target signal by spatial filtering an input signal; and a mask applier configured to obtain an output signal by applying a mask, obtained by using a spatial selectivity between the target signal and a noise of the target signal, to the filtered signal.

2. The sound signal processing apparatus of claim 1, wherein the mask applier calculates and obtains a directivity pattern of the target signal and a directivity pattern of the noise of the target signal by using the spatial filter.

3. The sound signal processing apparatus of claim 2, wherein the mask applier determines the spatial selectivity by using the directivity pattern of the target signal and the directivity pattern of the noise.

4. The sound signal processing apparatus of claim 3, wherein the spatial selectivity comprises a ratio of the directivity pattern of the target signal to the directivity pattern of the noise.

5. The sound signal processing apparatus of claim 2, wherein the directivity pattern of the target signal is calculated according to following equation 1, wherein k represents a frequency bin index, q represents a unit normal directional vector, N represents the number of input signal, Wi(k) represents a spatial filter of a i-th signal, ωk represents a frequency corresponding to a k-th bin, pi represents a vector indicating a location of a sensor of a i-th signal, pR represents a vector indicating a location of a reference sensor, and c represents the speed of sound $$D_{TE}(k,q)=\Sigma_{i=1}^{N}W_{TE}^{i}\exp[-j\omega_k(p_i-p_R)^Tq/c] \quad \text{Equation 1}$$

6. The sound signal processing apparatus of claim 1, wherein the noise is a main noise of the target signal.

7. The sound signal processing apparatus of claim 1, wherein the filtered signal further comprises a non-target signal.

8. The sound signal processing apparatus of claim 7, wherein the spatial filter comprises a target-extraction filter configured to obtain the target signal from the input signal and a target rejection filter configured to obtain the non-target signal from the input signal.

9. The sound signal processing apparatus of claim 8, wherein the mask applier calculates the directivity pattern of the target signal and the directivity pattern of the noise of the target signal and determines the spatial selectivity based on the directivity pattern of the target signal and the directivity pattern of the noise.

10. The sound signal processing apparatus of claim 7, wherein the mask applier obtains the mask by using a ratio of a target signal of the filtered signal to a non-target signal of the filtered signal.

11. The sound signal processing apparatus of claim 1, wherein the mask is calculated according to following equation 2, where k represents a frequency bin index, τ represents a frame index, M(k,τ) represents a mask in k and τ, R(k) represents a spatial selectivity, SNR(k,τ) represents a ratio of a target signal to a non-target signal, and FR(τ) represents an inverse number of a ratio of a target signal to a non-target signal $$M(k,\tau)=\frac{1}{1+F_R(\tau)\exp[-\alpha(\log R(k)+\beta)\log(SNR(k,\tau))]}. \quad \text{Equation 2}$$

12. The sound signal processing apparatus of claim 1, further comprising:

a convertor configured to convert the input signal from a time domain into a frequency domain.

13. The sound signal processing apparatus of claim 12, wherein the convertor converts the input signal by using Fourier Transform, Fast Fourier Transform (FFT), or Short-Time Fourier Transform (STFT).

14. The sound signal processing apparatus of claim 12, further comprising:

an invertor configured to invert the output signal from the frequency domain into the time domain.

15. The sound signal processing apparatus of claim 1, wherein the spatial filter performs a spatial filtering by using at least one of a beam-forming technique, the Independent Component Analysis (ICA) technique, the Independent Vector Analysis (IVA) technique and the Minimum power distortionless response (MPDR) technique.

16. A sound signal processing method comprising:

obtaining a filtered signal including a target signal by performing a spatial filtering by applying a spatial filter to an input signal, obtaining a mask by using a spatial selectivity between the target signal and a noise of the target signal; and obtaining an output signal by applying the mask to the filtered signal.

17. The sound signal processing method of claim 16, wherein the obtaining of a mask comprises calculating a directivity pattern of the target signal and a directivity pattern of the noise of the target signal by using the spatial filter.

18. The sound signal processing method of claim 17, wherein the obtaining of a mask further comprises determining the spatial selectivity by using the directivity pattern of the target signal and the directivity pattern of the noise.

19. The sound signal processing method of claim 16, wherein the filtered signal further comprises a non-target signal.

20. The sound signal processing method of claim 19, wherein the spatial filter comprises a target-extraction filter configured to obtain a target signal from the input signal and a target rejection filter configured to obtain a non-target signal from the input signal.

21. The sound signal processing method of claim 20, wherein obtaining a mask comprises calculating a directivity pattern of the target signal and a directivity pattern of the noise of the target signal by using the target-extraction filter and determining the spatial selectivity based on the directivity pattern of the target signal and the directivity pattern of the noise.

22. The sound signal processing method of claim 16 further comprising:

converting an input signal from a time domain into a frequency domain, and inverting an output signal from the frequency domain into the time domain.

23. A vehicle comprising an input unit configured to receive a sound and output an input signal corresponding to the received sound;

a signal processor configured to obtain a filtered signal by applying a spatial filter to the input signal, obtain a mask by using a spatial selectivity between a target signal of the filtered signal and a non-target signal of the filtered signal, and obtain an output signal by applying the mask to the filtered signal; and an output unit configured to output the output signal.

24. The vehicle of claim 23 further comprising:

a controller configured to control components and devices in the vehicle by using the output signal.

25. The vehicle of claim 23, wherein the filtered signal comprises the target signal and the non-target signal, and the spatial filter comprises a target-extraction filter and a target rejection filter.

26. The vehicle of claim 25, wherein the signal processor calculates a directivity pattern of the target signal and a directivity pattern of a noise of the target signal by using the the target-extraction filter, and determines the spatial selectivity based on the directivity pattern of the target signal and the directivity pattern of the noise.

27. The vehicle of claim 26, wherein the signal processor obtains the mask by using a ratio of the target signal of the filtered signal to the non-target signal of the filtered signal.

* * * * *